(12) United States Patent
Staun

(10) Patent No.: US 12,232,652 B2
(45) Date of Patent: Feb. 25, 2025

(54) MULTI-PURPOSE HANDHELD KITCHEN APPLIANCE

(71) Applicant: Midea Group Co., Ltd., Foshan (CN)

(72) Inventor: Paul R. Staun, Sharonville, OH (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/420,092

(22) Filed: Jan. 23, 2024

(65) Prior Publication Data

US 2024/0156304 A1 May 16, 2024

Related U.S. Application Data

(62) Division of application No. 16/836,121, filed on Mar. 31, 2020, now Pat. No. 11,963,637.

(51) Int. Cl.
| | |
|---|---|
| *A47J 43/06* | (2006.01) |
| *A47J 43/07* | (2006.01) |
| *A47J 43/10* | (2006.01) |
| *A47J 44/00* | (2006.01) |
| *A47J 43/044* | (2006.01) |

(52) U.S. Cl.
CPC ........... *A47J 43/06* (2013.01); *A47J 43/0711* (2013.01); *A47J 43/1093* (2013.01); *A47J 44/00* (2013.01); *A47J 2043/04418* (2013.01); *A47J 2043/04427* (2013.01)

(58) Field of Classification Search
CPC .. A47J 43/06; A47J 44/00; A47J 2043/04409; B01F 33/5011
USPC .......................................................... 99/486
See application file for complete search history.

(56) References Cited

U.S. PATENT DOCUMENTS

| | | | |
|---|---|---|---|
| 5,316,382 A | 5/1994 | Penaranda | |
| 5,547,275 A | 8/1996 | Lillelund | |
| 5,567,047 A | 10/1996 | Fritsch | |
| 5,810,472 A | 9/1998 | Penaranda | |
| 6,641,298 B2 | 11/2003 | Safont | |
| 6,789,933 B2 | 9/2004 | Gili | |
| 6,817,750 B1 | 11/2004 | Sands | |
| 7,172,334 B2 | 2/2007 | Chiappetta | |
| 7,267,476 B2 | 9/2007 | Rutigliano | |
| 7,993,054 B2 * | 8/2011 | Wulf | A47J 43/046 366/205 |
| 8,033,712 B2 | 10/2011 | Calange | |

(Continued)

FOREIGN PATENT DOCUMENTS

| | | |
|---|---|---|
| CN | 1681427 A | 10/2005 |
| CN | 204839231 U | 12/2015 |

(Continued)

OTHER PUBLICATIONS

Kitchenaid, KHB1231 KHB2351 Hand Blender Instructions, KitchenAid.com, 2011.

(Continued)

*Primary Examiner* — Marc C Howell
(74) *Attorney, Agent, or Firm* — Gray Ice Higdon

(57) ABSTRACT

A multi-purpose handheld kitchen appliance includes a controller configured to customize various aspects of the appliance based upon a type of attachment coupled to the appliance, e.g., to controllably vary a motor speed, to selectively disable an activation control, and/or to rotate a display based on a type of attachment and/or a gyroscope input.

20 Claims, 6 Drawing Sheets

(56) References Cited

U.S. PATENT DOCUMENTS

| | | | |
|---|---|---|---|
| 8,353,620 | B2 | 1/2013 | Ogrizek |
| 9,055,843 | B2 | 6/2015 | Stenglein |
| 10,022,614 | B1 | 7/2018 | Tran |
| 10,173,188 | B2 | 1/2019 | Cheung |
| 10,277,157 | B2 | 4/2019 | Schroeder |
| 10,299,629 | B2 | 5/2019 | Bascom |
| 10,399,050 | B1 | 9/2019 | Bertsch |
| 10,415,868 | B2 | 9/2019 | Grepper |
| 10,427,119 | B1 | 10/2019 | Bertsch |
| 2007/0133342 | A1 | 6/2007 | Gili |
| 2009/0084274 | A1* | 4/2009 | Kovacic ............... A47J 43/06 99/348 |
| 2015/0265102 | A1 | 9/2015 | Kidd |
| 2016/0256004 | A1 | 9/2016 | Kolar |
| 2016/0256008 | A1* | 9/2016 | Dickson, Jr. ............. F16P 1/00 |
| 2017/0055775 | A1* | 3/2017 | Hoare .................. A47J 43/06 |
| 2017/0120208 | A1 | 5/2017 | Kolar |
| 2017/0216797 | A1 | 8/2017 | Hirth |
| 2018/0059790 | A1 | 3/2018 | Kolar |
| 2018/0333007 | A1 | 11/2018 | Ganahl |
| 2019/0001288 | A1 | 1/2019 | Ciepiel |
| 2019/0082893 | A1 | 3/2019 | Faulkner-Edwards |
| 2019/0117005 | A1 | 4/2019 | Kettavong |
| 2019/0150671 | A1 | 5/2019 | Williams |
| 2019/0208960 | A1 | 7/2019 | Schroeder |
| 2019/0313854 | A1 | 10/2019 | Paskert |
| 2021/0298530 | A1 | 9/2021 | Staun |

FOREIGN PATENT DOCUMENTS

| | | |
|---|---|---|
| CN | 107847086 A | 3/2018 |
| CN | 110662468 A | 1/2020 |
| CN | 110710897 A | 1/2020 |
| DE | 4126516 C1 | 8/1992 |
| EP | 1922795 B1 | 5/2008 |
| EP | 1980185 A1 | 10/2008 |
| EP | 2956040 A1 | 12/2015 |
| WO | 2005006930 A1 | 1/2005 |
| WO | 2007020134 A1 | 2/2007 |
| WO | 2010012719 A1 | 2/2010 |
| WO | 2010012732 A2 | 2/2010 |
| WO | 2017157965 A1 | 9/2017 |
| WO | 2017208027 A2 | 12/2017 |
| WO | 2017208028 A1 | 12/2017 |
| WO | 2017212281 A2 | 12/2017 |
| WO | 2018085369 A1 | 5/2018 |
| WO | 2018104743 A2 | 6/2018 |
| WO | 2018175369 A1 | 9/2018 |
| WO | 2019058095 A1 | 3/2019 |

OTHER PUBLICATIONS

Cuisinart, Instruction and Recipe Book, Smart Stick Hand Blender CSB-77, www.cuisinart.com, 2011.

Braun, Instructions Multimix 5, www.braunhousehold.com, 2014.

Braun, Braun MultiQuick 7 MQ777 Instructions, www.braunhousehold.com, 2014.

International Search Report and Written Opinion issued in Application No. PCT/CN2020/101772 dated Dec. 30, 2020.

* cited by examiner

MULTI-PURPOSE HANDHELD KITCHEN APPLIANCE

BACKGROUND

Handheld kitchen appliances are frequently used for various purposes in the kitchen, e.g., to facilitate the preparation of meals, to blend drinks, to chop or mix ingredients, etc. Many handheld kitchen appliances, however, are single-purpose appliances having only limited functions, resulting in many consumers having to purchase and store several different appliances to serve their needs. To address these limitations, various multi-purpose handheld kitchen appliances have been developed, with support for various types of removable attachments that are capable of emulating different single-purpose handheld kitchen appliances, and generally a single motor or drive system capable of driving the removable attachments.

It has been found, however, that the controls of conventional multi-purpose handheld kitchen appliances are generally very rudimentary in nature, and often include a basic on/off switch that transitions the drive system between on and off states, or in some instances support for multiple drive speeds via a knob or other mechanism capable of selecting between different discrete drive speeds or within a range of drive speeds. Ultimately, however, it is generally incumbent upon the user, who may lack suitable experience or expertise, to control the drive state and/or speed of the appliance. Given that different attachments may operate better or worse at different drive speeds, selecting an optimal drive speed for a particular attachment may therefore be a challenge for some users. Furthermore, different types of attachments may require a user to orient a multi-purpose handheld kitchen appliance in different orientations during use, and doing so may orient various controls and/or displays in different orientations that may be difficult to use. Therefore, there exists a need for multi-purpose handheld kitchen appliances that are easier and more convenient to user when operating different types of attachments.

SUMMARY

The herein-described embodiments address these and other problems associated with the art by providing a multi-purpose handheld kitchen appliance including a housing with a motor and an attachment that is removably coupled to the housing to form a unitary body, where the attachment is configured to be driven by the motor when the attachment is coupled to the housing, and where the controller of the appliance is configured to customize various aspects of the appliance based upon the type of the attachment coupled to the housing. For example, in various embodiments, a multi-purpose handheld kitchen appliance may be customized to controllably vary a motor speed, selectively disable an activation control and/or rotate a display based on a type of attachment.

In a first aspect, a multi-purpose handheld kitchen appliance includes: a housing with a motor; an attachment removably coupled to the housing to form a unitary body therewith where the attachment is configured to be driven by the motor when the attachment is coupled to the housing; an attachment identifier coupled to the housing and configured to detect an attachment type of the attachment when the attachment is coupled to the housing; and a controller located in the housing and configured to: determine the attachment type of the attachment using the attachment identifier; and in response to an activation input by a user, controllably vary a speed of the motor among a plurality of speeds based at least in part on the determined attachment type.

In some embodiments, the controller is configured to controllably vary the speed of the motor by executing a programmed cycle that transitions between the plurality of speeds during the programmed cycle based on the determined attachment type. In other embodiments, the housing further includes a sensor, and the controller is further configured to receive data from the sensor and controllably vary the speed of the motor based on the data from the sensor. In still other embodiments, the attachment additionally includes a sensor, and the controller is further configured to receive data from the sensor and controllably vary the speed of the motor based on the data from the sensor.

In some embodiments, the multi-purpose handheld kitchen appliance additionally includes a display disposed at an opposite end of the housing from the attachment. In some such embodiments, the controller is further configured to rotate the display based upon the determined attachment type. In other such embodiments, the multi-purpose handheld kitchen appliance additionally includes a gyroscope, where the controller is configured to detect, using the gyroscope, an orientation of the unitary body and rotate the display based upon the orientation of the unitary body.

In some embodiments, the attachment is an immersion blender attachment, a hand mixer attachment, a whisk attachment, a nut chopping attachment, a salad shredder attachment, a spiralizer attachment, a pasta making attachment, or a juicer attachment.

In another aspect, a multi-purpose handheld kitchen appliance includes: a housing including a motor; an attachment removably coupled to the housing to form a unitary body therewith where the attachment is configured to be driven by the motor when the attachment is coupled to the housing; an attachment identifier coupled to the housing and configured to detect an attachment type of the attachment when the attachment is coupled to the housing; a gyroscope positioned to sense an orientation of the unitary body; a display disposed on the housing; and a controller disposed in the housing and configured to: determine the attachment type of the attachment using the attachment identifier; detect, using the gyroscope, the orientation of the unitary body and rotate the display based upon the orientation of the unitary body; and control the motor based at least in part on the determined attachment type.

In some embodiments, the in response to an activation input by a user, the controller is configured to controllably vary a speed of the motor among a plurality of speeds based at least in part on the determined attachment type. In some embodiments, the controller is configured to controllably vary a speed of the motor by executing a programmed cycle that transitions between the plurality of speeds during the programmed cycle based on the determined attachment type. In other embodiments, the housing additionally includes a sensor, and the controller is further configured to receive data from the sensor and controllably vary a speed of the motor based on the data from the sensor. In other embodiments, the attachment additionally includes a sensor, and the controller is further configured to receive data from the sensor and controllably vary a speed of the motor based on the data from the sensor.

In some embodiments, the attachment is an immersion blender attachment, a hand mixer attachment, a whisk attachment, a nut chopping attachment, a salad shredder attachment, a spiralizer attachment, a pasta making attachment, or a juicer attachment.

In some embodiments, the controller is further configured to disable the display based at least in part on the determined attachment type.

In some embodiments, the housing additionally includes a first activation control that controls the motor, and the controller is configured to disable the first activation control on the housing and activate a second activation control on the attachment that activates the motor based at least in part on the determined attachment type.

In yet another aspect, a multi-purpose handheld kitchen appliance includes: a housing including a motor and a first activation control configured to activate the motor; an attachment removably coupled to the housing to form a unitary body therewith where the attachment is configured to be driven by the motor when the attachment is coupled to the housing, the attachment including a second activation control configured to activate the motor when the attachment is coupled to the housing; an attachment identifier coupled to the housing and configured to detect an attachment type of the attachment when the attachment is coupled to the housing; a controller disposed in the housing and configured to: determine the attachment type of the attachment using the attachment identifier; in response to the determination of the attachment type, disable the first activation control on the housing and activate the second activation control on the attachment such that the motor is activated in response to selection of the second activation control rather than in response to selection of the first activation control when the attachment is coupled to the housing; and control the motor based at least in part on the determined attachment type.

In some embodiments, in response to an activation input by a user, the controller is configured to controllably vary a speed of the motor among a plurality of speeds based at least in part on the determined attachment type. In some embodiments, the multi-purpose handheld kitchen appliance additionally includes a display disposed at an opposite end of the housing from the attachment. In some such embodiments, the multi-purpose handheld kitchen appliance additionally includes a gyroscope, where the controller is configured to detect, using the gyroscope, an orientation of the unitary body and rotate the display based upon the orientation of the unitary body.

In another aspect, a multi-purpose handheld kitchen appliance includes: a housing including a motor; an attachment identifier coupled to the housing and configured to detect an attachment type of an attachment when the attachment is coupled to the housing; and a controller disposed in the housing and configured to determine the attachment type of the attachment using the attachment identifier; and in response to an activation input by a user, controllably vary a speed of the motor among a plurality of speeds based at least in part on the determined attachment type.

In some embodiments, the multi-purpose handheld kitchen appliance additionally includes an attachment removably coupled to the housing to form a unitary body therewith and configured to be driven by the motor when the attachment is coupled to the housing. In some such embodiments, the attachment further includes a sensor, and the controller is further configured to receive data from the sensor and control the motor based on the data from the sensor. In some embodiments, the attachment is an immersion blender attachment, a hand mixer attachment, a whisk attachment, a nut chopping attachment, a salad shredder attachment, a spiralizer attachment, a pasta making attachment, or a juicer attachment.

In some embodiments, the multi-purpose handheld kitchen appliance additionally includes a gyroscope, where the controller is configured to detect, using the gyroscope, an orientation of the unitary body and rotate a display on the housing based upon the orientation of the unitary body.

In some embodiments, the controller is configured to controllably vary a speed of the motor by executing a programmed cycle that transitions between the plurality of speeds during the programmed cycle based on the determined attachment type. In other embodiments, the housing further includes a sensor, and the controller is further configured to receive data from the sensor and controllably vary a speed of the motor based on the data from the sensor.

In still another aspect, a multi-purpose handheld kitchen appliance includes: a housing including a motor; an attachment identifier coupled to the housing and configured to detect an attachment type of an attachment when the attachment is coupled to the housing; a gyroscope positioned within the housing to sense an orientation of the housing; a display disposed on the housing; and a controller located in the housing and configured to: determine the attachment type of an attachment using the attachment identifier; detect, using the gyroscope, the orientation of the housing and rotate the display based upon the orientation of the housing; and control the motor, based at least in part on the determined attachment type.

In some embodiments, the multi-purpose handheld kitchen additionally includes an attachment removably coupled to the housing to form a unitary body therewith and configured to be driven by the motor when the attachment is coupled to the housing. In some such embodiments, the attachment further includes a sensor, and the controller is further configured to receive data from the sensor and controllably vary a speed of the motor based on the data from the sensor. In other such embodiments, the attachment is an immersion blender attachment, a hand mixer attachment, a whisk attachment, a nut chopping attachment, a salad shredder attachment, a spiralizer attachment, a pasta making attachment, or a juicer attachment. In still other such embodiments, the housing additionally includes a first activation control configured to control the motor, and where in response to the determination of the attachment type, the controller is configured to disable the first activation control on the housing and activate a second activation control on the attachment such that the motor is activated in response to selection of the second activation control rather than in response to selection of the first activation control when the attachment is coupled to the housing.

In some embodiments, in response to an activation input by a user, the controller is configured to controllably vary a speed of the motor among a plurality of speeds based at least in part on the determined attachment type. In other embodiments, the controller is configured to controllably vary a speed of the motor by executing a programmed cycle that transitions between the plurality of speeds during the programmed cycle based on the determined attachment type. In still other embodiments, the housing further includes a sensor, and the controller is further configured to receive data from the sensor and controllably vary a speed of the motor based on the data from the sensor.

In some embodiments, the controller is further configured to disable the display based at least in part on the determined attachment type.

In still yet another aspect, a multi-purpose handheld kitchen appliance includes: a housing including a motor and a first activation control configured to activate the motor; an attachment identifier coupled to the housing and configured to detect an attachment type of an attachment when the attachment is coupled to the housing; a controller disposed in the housing and configured to: determine the attachment type of the attachment using the attachment identifier; in response to the determination of the attachment type, disable the first activation control on the housing and activate a second activation control on the attachment such that the motor is activated in response to selection of the second activation control rather than in response to selection of the first activation control when the attachment is coupled to the housing; and control the motor based at least in part on the determined attachment type.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 4A is a cross-sectional view of the attachment identifier of the multi-purpose handheld kitchen appliance; FIG. 4B is a cross-sectional view of the attachment type communicator of the attachment.

DETAILED DESCRIPTION

Figure 1:
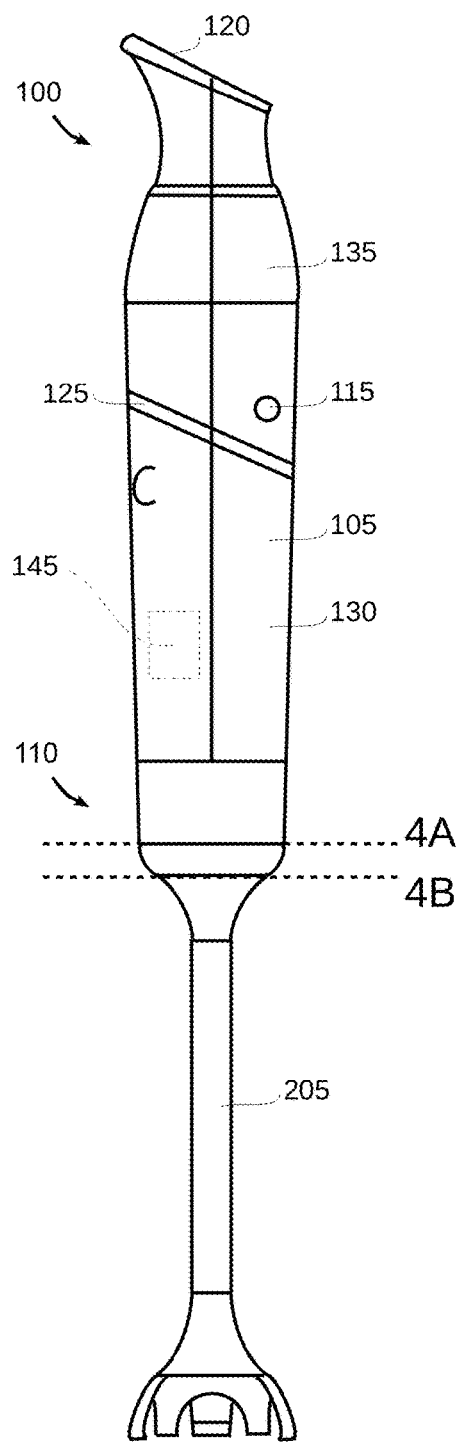
FIG. 1 is a front view of a multi-purpose handheld kitchen appliance with a first attachment consistent with some embodiments of the invention.

Turning now to the drawings, wherein like numbers denote like parts throughout the several views, FIGS. 1-4A-B illustrate an exemplary multi-purpose handheld kitchen appliance 100 with an attachment 205, 210 removably coupled therewith. The type of attachment 205, 210 may vary. For example, as illustrated in FIG. 1, the attachment 205 is an immersion blender attachment 205; while in FIG. 2, the attachment 210 is a whisk attachment 210. These attachment types are not to be construed as limiting, other possible attachment types include, but are not limited to: a hand mixer attachment (see FIGS. 6A-B); a nut chopping attachment; a salad shredder attachment; a spiralizer attachment; a pasta making attachment; a juicer attachment; a knife carving attachment; a baby food blender attachment; a smoothie attachment; a potato mashing attachment; or the like.

The multi-purpose handheld kitchen appliance 100 may include a housing 105 to enclose internal electrical components of the appliance 100, including, for example, a motor 145 that powers the multi-purpose handheld kitchen appliance 100, including the attachment 205, 210. A suitable separable mechanical coupling may also be used in some embodiments to mechanically couple an attachment to motor 145 when the attachment is secured to the housing. The housing 105 may also include one or more activation controls 115 that a user may actuate in order to control the motor 145, including powering the motor on and/or off and/or controlling the speed of the motor. In some instances, these one or more activation controls 115 may include buttons, knobs, sliding mechanisms or the like. In some instances, see for example FIGS. 6A-B, the attachment may also include one or more activation controls 615 that a user may actuate in order to control the motor 545, including powering the motor on and/or off and/or controlling the speed of the motor. As will be described herein, multi-purpose handheld kitchen appliance 100 may be capable of disabling the activation control(s) 115 on the housing 105, so that the activation control(s) 615 of the attachment may be used.

It will be appreciated that when an attachment 205, 210 is removably coupled to the housing 105 in the illustrated embodiments, the combination of these components generally forms a unitary body 110 capable of being held and operated by a user effectively in a similar manner to a single-purpose appliance designed to implement the various functions supported by the attachment 205, 210, e.g., a mixer attachment, coupled to the housing effectively functions in a similar manner to a conventional hand mixer. Once coupled and forming a unitary body, the motor 145 of the multi-purpose handheld appliance 100 disposed in the housing 105 may be used to drive the attachment 205, 210. The multi-purpose handheld kitchen appliance 100 may also, in some instances, include a display 120 (see particularly FIGS. 3A-B). In some instances, the display 120 may be located at an opposite end of the housing 105 from the attachment 205, 210.

In some instances, such as illustrated in FIGS. 1-4A-B, the housing 105 may also be constructed so as to allow for movement, for an example with a hinge, swivel/rotation mechanism 125, or the like. In such instances, the motor 145 may be located in a lower portion 130 of the housing (e.g., closer to the attachment), so that the upper portion 135 may generally be moved (e.g., be hinged, swiveled, rotated, or the like) in order to improve the usability ergonomics for a user in some applications (e.g., blending, mixing applications, etc.). As will be described in greater detail herein, it may be desirable in some such instances for the display 120 to rotate accordingly with the movement of the upper portion 135 of the housing 105, so it may be easier for a user to read. FIGS. 3A-B illustrate an example of such rotation, but are not intended to be limiting.

Figure 4A:
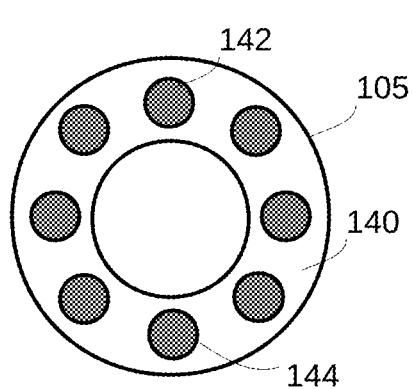
FIGS. 4A-B are cross-sectional views of the multi-purpose handheld kitchen appliance of FIG. 1, taken along lines 4A and 4B, respectively.
Figure 4B:
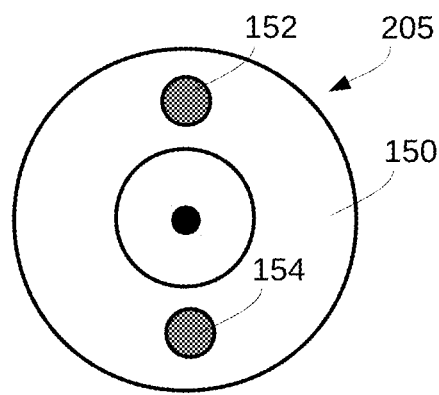

FIGS. 4A-B illustrate an exemplary attachment identifier 140 that may be coupled to the housing 105 and may be able to determine the type of attachment 205, 210 coupled to the housing 105. The attachment identifier may mate, contact, or otherwise pair with an attachment type communicator 150 on the attachment 205, 210 in order to identify the type of attachment. The attachment identifier 140 illustrated in FIG.

4A and corresponding attachment type communicator 150 illustrated in Fig. B are implemented as conductive contact points that, when placed in contact with one another, close an electrical circuit that can be used to identify an attachment type.

For example, in one example embodiment, eight conductive contact points may be defined in an annular array for attachment identifier 140, with one of the contact points, e.g., the top-most contact point 142, being a common contact point to which all of the attachment type communicators connect, and with the other seven contacts (e.g., the bottom-most contact point 144) configured to sense an electrical characteristic such as voltage, resistance, current, or a time-based signal. Each different attachment type includes an attachment type communicator 150 with a common contact point 152 that opposes common contact point 142 when the attachment is coupled to the housing 105, while different attachments include different combinations of additional contact points that are in electrical communication with the common contact point 152 and that oppose selected other contact points in the attachment identifier. Thus, for example, for attachment 205, a single contact point 154, disposed 180 degrees offset from the common contact point 152, may be used to uniquely identify the attachment, such that when attachment 205 is coupled to the housing 105, an electrical circuit is completed between contact points 142 and 144 of attachment identifier 140. Other attachment types may include contact points that offset selected other contact points in attachment identifier 140, and in some instances, an attachment type may be signaled based upon the presence of more than one additional contact point.

However, it will be appreciated that the contact points described herein are merely an illustrative example of an attachment identifier 140 (and corresponding attachment type communicator 150) and is not intended to be limiting. Other, non-limiting, examples of attachment identifier/attachment type communicator arrangements may include various mechanical or electromechanical arrangements capable of indicating to a controller what type of attachment is coupled to a housing, including, for example, depressible buttons or switches, slots and pins, plug and socket connectors, etc. Attachment type identification may also be implemented in some embodiments via an electronic solution where a controller disposed in the housing (described with reference to FIG. 8) polls the attachment for its type, and the attachment communicates its type via a wired or wireless message. Any other suitable electrical and/or mechanical methods suitable for detecting an attachment type may be used in other embodiments. In addition, in some instances, the attachment identifier 140 may be separate from the physical attachment mechanism of the housing 105 and the attachment 205, 210; while in other instances, the attachment identifier 140 may be incorporated as a part of the physical attachment mechanism. The attachment types illustrated herein are not to be construed as limiting, as there are many of types of attachments, some of which are provided herein, that may be utilized with the housing 105.

Figure 8:
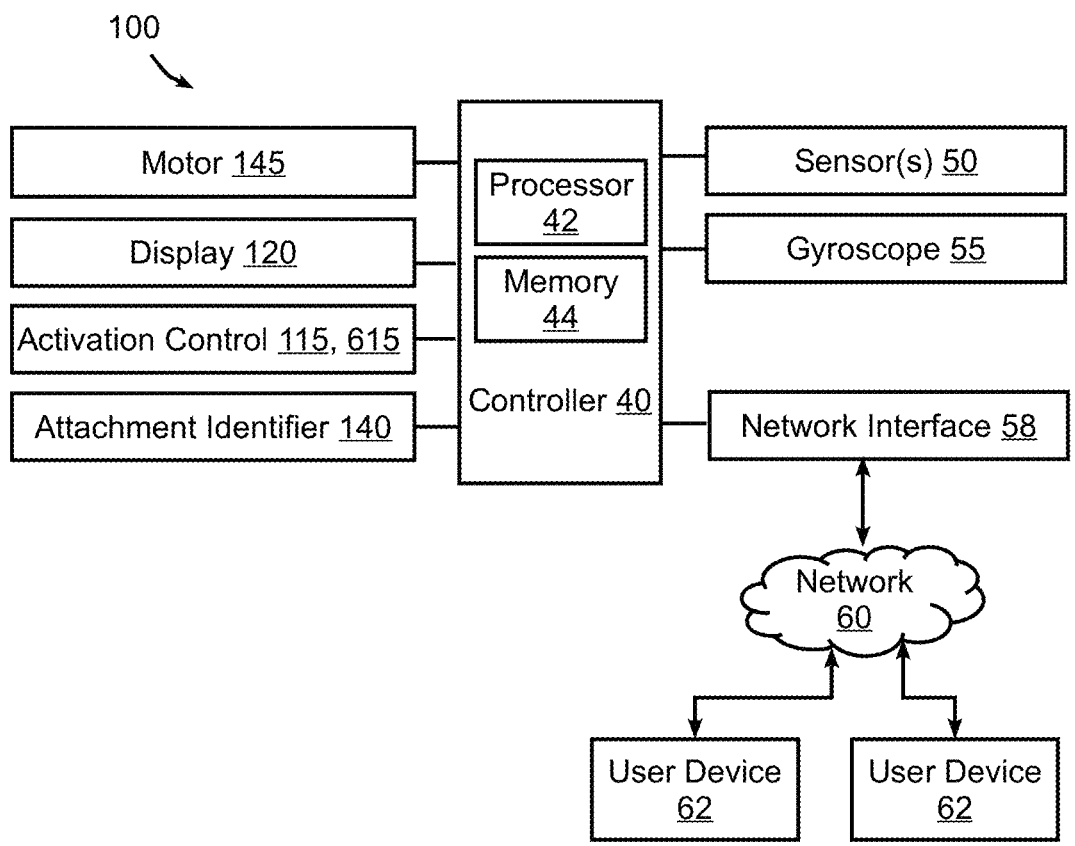
FIG. 8 is a block diagram of an example control system for the multi-purpose handheld kitchen appliance of FIG. 1.

A multi-purpose handheld kitchen appliance 100 consistent with the description herein may also generally include one or more controllers configured to control the operation of the multi-purpose handheld kitchen appliance 100 as well as manage interaction with a user. FIG. 8, for example, illustrates an example embodiment of a multi-purpose handheld kitchen appliance 100 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 8, controller 40 may be interfaced with various components, including a motor 145 or other drive for powering the multi-purpose handheld appliance 100 and one or more activation controls 115 on the housing for receiving user input (e.g., various combinations of switches, knobs, buttons, sliders, touchscreens or touch-sensitive displays, microphones or audio input devices, image capture devices, etc.). The controller 40 may be interfaced with an attachment identifier 140 coupled to the housing, that the controller may use to determine the type of attachment coupled to the housing. In some instances, the controller may also interface with one or more activation controls 615 on the attachment for receiving user input, and/or one or more displays 120 (including various indicators, graphical displays, textual displays, speakers, etc.) disposed on the housing and/or the attachment, as well as various additional components suitable for use in handheld kitchen appliance 100. For example, various attachments in some embodiments may include various electromechanical components such as motors, drives, actuators, etc. that may be controllable by controller 40 and powered by the housing. An attachment may also include a controller or other logic circuit in communication with the controller, and may include various controls, sensors, displays, etc. in communication with the controller.

Controller 40 may also be interfaced with various sensors 50, including various sensors usable in connection with adjusting or controlling a speed of the motor 145. For example, a sensor for determining motor torque may be used to adjust cycle times and/or speeds based on whether the motor has reached a steady state. As another example, a temperature sensor may be used to adjust speed and/or run time of the motor 145 of the handheld kitchen appliance 100, for example based on a sensed temperature of the item being blended. It is to be understood these are merely examples, and are not intended to be limiting, as other sensors known in the art may also be incorporated into the multi-purpose handheld kitchen appliance 100. In some instances, the sensor(s) may be disposed within the attachment 205, 210; while in other instances, the sensor(s) may be disposed in the housing 105. Controller 40 may also be interfaced with a gyroscope 55, which may allow the controller 40 to determine the orientation of the unitary body (e.g., the housing 105 and attachment 205, 210) and rotate the display 120 based upon the orientation of the unitary body. Such a gyroscope 55 may, in some instances, be located within the housing of the multi-purpose handheld kitchen appliance; however, in other instances, the gyroscope 55 may be located with an attachment.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 8 at 60. Network 60 may incorporate in some embodiments a home automation network, and various communication protocols may be supported, including various types of home automation communication protocols. In other embodiments, other wireless protocols, e.g., Wi-Fi or Bluetooth, may be used.

In some embodiments, multi-purpose handheld kitchen appliance 100 may be interfaced with one or more user devices 62 over network 60, e.g., computers, tablets, smart phones, wearable devices, etc., and through which multi-purpose handheld kitchen appliance 100 may be controlled and/or multi-purpose handheld kitchen appliance 100 may provide user feedback. For example, in some instances, the multi-purpose handheld kitchen appliance 100 may be wirelessly interfaced (e.g., via Bluetooth) with a user device 62, so that the user may communicate with handheld appliance through the user device 62. This may in some instances, include through the use of a voice assistant. In other instances, the multi-purpose handheld kitchen appliance 100 may be wirelessly interfaced (e.g., via Bluetooth) with a user device 62 so that the user device 62 may be used as a display. In still other instances, the multi-purpose handheld kitchen appliance 100 may be wirelessly interfaced (e.g., via Bluetooth) with a user device 62 so that additional preprogrammed cycles may be added to the multi-purpose handheld kitchen appliance 100, for example if a new attachment type is released.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized, and/or supplemented with other techniques known in the art, and therefore, the invention is not limited to the particular sequences of operations described herein.

Numerous variations and modifications to the multi-purpose handheld kitchen appliance 100 illustrated in FIGS. 1-4A-B will be apparent to one of ordinary skill in the art, as will become apparent from the description below. Therefore, the invention is not limited to the specific implementations discussed herein.

Figure 5A:
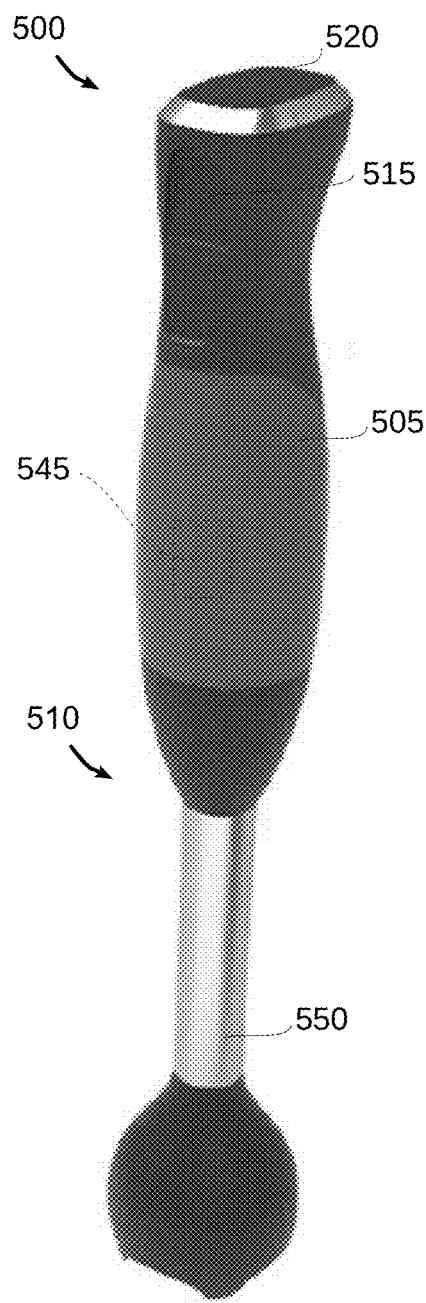
FIG. 5A-B are front and rear perspective views, respectively, of another multi-purpose handheld kitchen appliance consistent with some embodiments of the invention and having a first attachment coupled thereto.
Figure 5B:
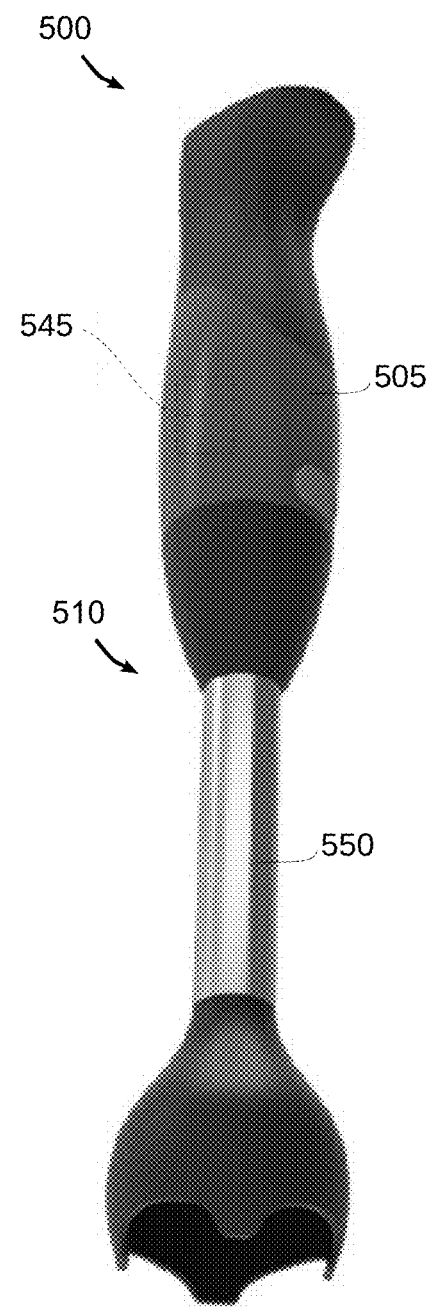
Figure 6A:
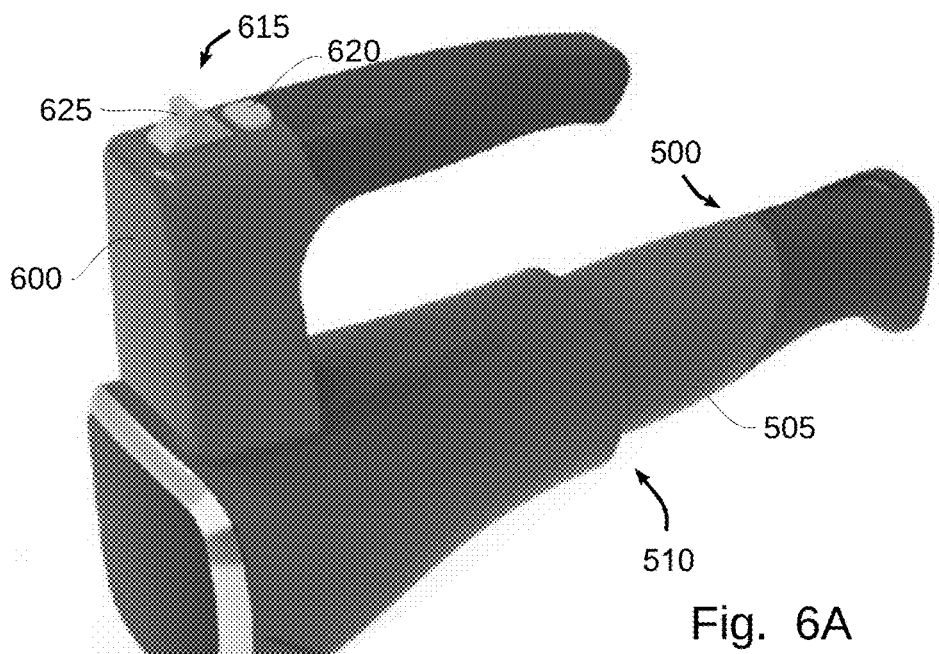
FIG. 6A-B are front and rear perspective views, respectively, of the multi-purpose handheld kitchen appliance of FIGS. 5A-B with a second attachment coupled thereto.
Figure 6B:
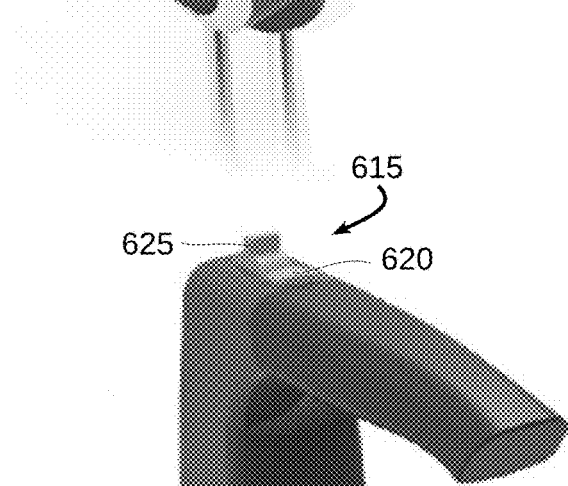
Figure 6B:
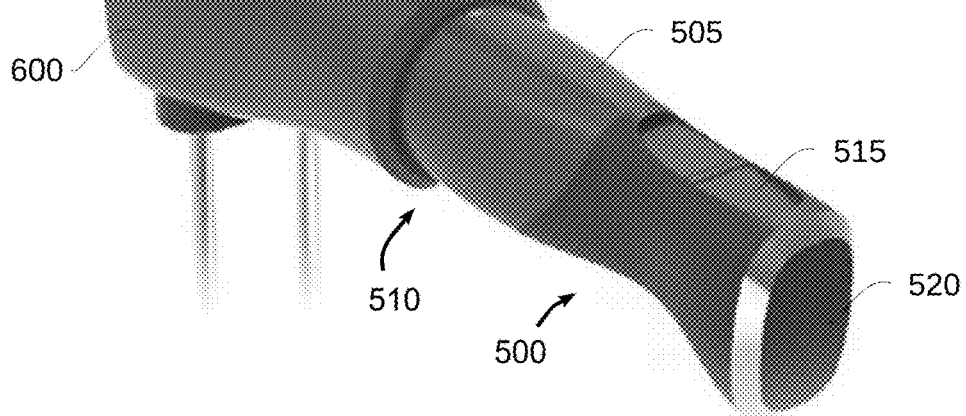

Now turning to FIGS. 5A-B and 6A-B, another exemplary multi-purpose handheld kitchen appliance 500 is described herein. FIGS. 5A-B illustrate front and rear perspective views of the multi-purpose handheld kitchen appliance 500 with a first attachment 550 (an immersion blender attachment) removably coupled therewith; while FIGS. 6A-B illustrate front and rear perspective views of the multi-purpose handheld kitchen appliance 500 with a second attachment 600 (a hand mixer attachment) removably coupled therewith. The types of attachments illustrated are merely exemplary, and may vary, other possible attachment types include, but are not limited, to: a nut chopping attachment, a salad shredder attachment, a spiralizer attachment, a pasta making attachment, a juicer attachment, a knife carving attachment, a baby food blender attachment, a smoothie attachment, a potato mashing attachment, or the like. Similar to the handheld kitchen appliance illustrated in FIGS. 1-4, the multi-purpose handheld kitchen appliance of FIGS. 5A-B and 6A-B may include a housing 505 to enclose internal electrical components of the appliance 500, including a motor 545 that powers the multi-purpose handheld kitchen appliance 500 and the attachment 550, 600.

The housing 505 may also include one or more activation controls 515 that a user may actuate in order to control the motor 545, including powering the motor on and/or off and/or controlling the speed of the motor. Some attachments, for example the attachment 600, may also include one or more additional activation controls 615 on the attachment itself that a user may actuate in order to control the motor 545. In such instances, the controller (described with reference to FIG. 8) may utilize the attachment identifier to identify the attachment 600 and disable the activation control 515 on the housing 505 and enable the activation control 615 on the attachment 600. For example, as previously mentioned the attachment illustrated in FIGS. 5A-B is an immersion blender, while the attachment illustrated in FIGS. 6A-B is a hand mixer. Where the attachment is the immersion blender (FIGS. 5A-B), the one or more activation controls 515 on the housing may be used by a user to control the motor 545. In other instances, for example where the attachment includes one or more activation controls 615, such as the hand mixer of FIGS. 6A-B, the one or more activation controls 515 on the housing may be deactivated. For example, as illustrated in FIGS. 6A-B, activation controls 615 of the hand mixer attachment 600 includes a power button 620 and a speed adjustment slider 625. The one or more activation controls 615 of the attachment 600 may then be activated, so that the motor 545 may be controlled by a user though these one or more activation controls 615 on the attachment 600. Also, at this time the activation control 515 may be disabled. Doing so may, for example, prevent the activation control 515 from being inadvertently actuated by a user. In some embodiments, the disabled activation control may be a power control that activates or deactivates the motor, and as such, inadvertent actuation of the motor via the activation control 515 on the housing 505 may be avoided.

As with the previously described example, it will be appreciated that when the attachment 550, 600 is removably coupled to the housing 505 the combination generally forms a unitary body 510 capable of being held and operated by a user in a similar manner as a single-purpose appliance that is designed to implement the various functions supported by the attachment 550, 600 (e.g., a mixer attachment 600 coupled to the housing 505 effectively functions in a similar manner to a conventional hand mixer). Once coupled, the motor 545 of the multi-purpose handheld kitchen appliance 500 may be used to drive the attachment 550, 600. The multi-purpose handheld kitchen appliance 500 may also include a display 520 on the housing 505. As is illustrated herein, the display 520 may be located at an opposite end of the housing 505 from the attachment 550, 600. In some instances, the controller (described with reference to FIG. 8) may disable the display 520 based at least in part on the attachment type (also determined by the controller).

Figure 7:
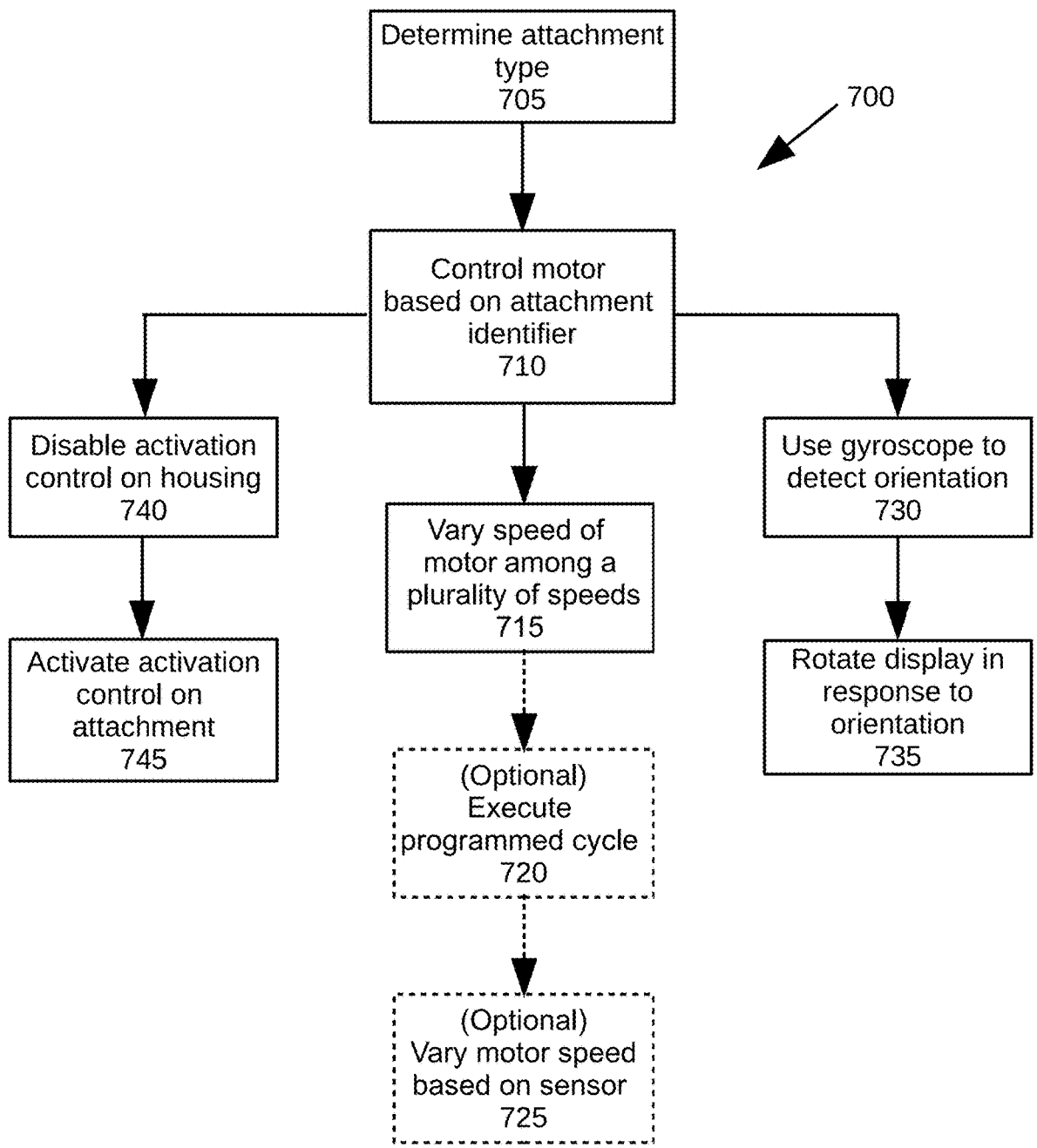
FIG. 7 is a flowchart illustrating an example sequence of operations for using the multi-purpose handheld kitchen appliance of FIG. 1.

Now turning to FIG. 7, an example embodiment of an operational flow 700 for a multi-purpose handheld kitchen appliance 100, 500 with one or more attachments 205, 210, 550, 600 is described herein. In block 705, an attachment type of the attachment is determined using the attachment identifier. When an attachment is removably coupled to the housing forming a unitary body, an attachment identifier may be able to detect the type of the attachment (e.g., whether the attachment is an immersion blender attachment, whisk attachment, handheld mixer attachment, or any other type of attachment).

In block 710, the motor is controlled based, at least in part, on the determined attachment type. More specifically, in block 715, the speed of the motor may be controllably varied among a plurality of speeds based, at least in part, on the determined attachment type. In this regard, the speed of the motor may be controllably varied among a plurality of speeds within a given operational cycle for the appliance, e.g., such that any time the motor of the appliance is activated, run for a period of time, and then deactivated, the motor may be configured to run at multiple speeds, with the multiple speeds at which the motor runs based at least in part on the determined attachment type.

In some instances, for example, the multiple speeds may include a range of speeds that are controlled by a variable control of the appliance, e.g., a trigger, continuous slider, or other control capable of generating a variable control signal. In other instances, the multiple speeds may include multiple discrete speeds, e.g., as controlled by one or more controls such as multiple buttons, a multi-position slider, or other control or combination of controls capable of generating one or more discrete control signals. In each of these instances, the attachment type may be used, for example, to control the range of speeds or the mappings of speeds to different controls. Thus, for example, with a trigger or continuous slider, one attachment type may enable a user to select between a range of 0 to 1000 rpm, while another attachment type may enable a user to select between a range of 0 to 400 rpm. As another example, one attachment type may map "low," "medium," and "high" buttons to 200, 400 and 600 rpm, while another attachment type may map the same buttons to 400, 800 and 1200 rpm. Thus, when a user varies the speed input to the appliance during an operational cycle, the attachment type is used in combination with the speed input to control the actual speed of the motor.

In other instances, for example as illustrated in block 720, the speed of the motor may be, optionally, controllably varied by executing a programmed cycle that allows for transitioning between the plurality of speeds during the programmed cycle based on the determined attachment type. This may be achieved, for example, through storing various program cycles either on the memory of the controller or accessing various programs remotely via network connection. Cycles may be loaded to support multiple attachments, so that a user may be able to more precisely control on the cycle that is run. As a non-limiting example, a first program may be set to run at high speed for thirty (30) seconds; a user may then select (e.g., through the display or a networked application) a particular option or setting that may change the cycle. As an example, an ice chop cycle may start the cycle at a slower speed and then cycle the speed up and down in order to break up the ice; while, in contrast, a liquid cycle (e.g., for mixing liquids) may be a fast thirty (30) second cycle. Other types of programmable cycles that vary speeds throughout the cycles may be used in various embodiments and for various types of attachments, and it will be appreciated that at least in some of the programmable cycles, the speed of the motor is varied during the course of a given cycle, e.g., between different speeds and/or between motor on and off (e.g., in the case of pulsing-type cycles).

In still other instances, for example as illustrated in block 725, the speed of the motor may be, optionally, controllably varied based on data received from a sensor in combination with the attachment type, e.g., based upon a closed control loop that varies the speed based upon the sensor input. As described herein, such a sensor may be disposed either within the housing or within the attachment. As an example, a sensor for determining motor torque may be used to adjust the motor (including both cycle times and cycle speeds) based on whether the motor has reached a steady state or otherwise based on torque. As another example, a temperature sensor may be used to adjust the motor (including both cycle times and cycle speeds) based on, for example, the temperature of the item being blended. In both examples, the attachment type may be used to control the range of speeds within which a control loop operates, as well as other factors such as whether a closed loop control is even used (e.g., so that temperature-based control is only active for certain types of attachments). It is to be understood these are merely examples, and are not intended to be limiting, as other sensors known in the art may also be incorporated into the multi-purpose handheld kitchen appliance and used to control the motor.

Figure 2:
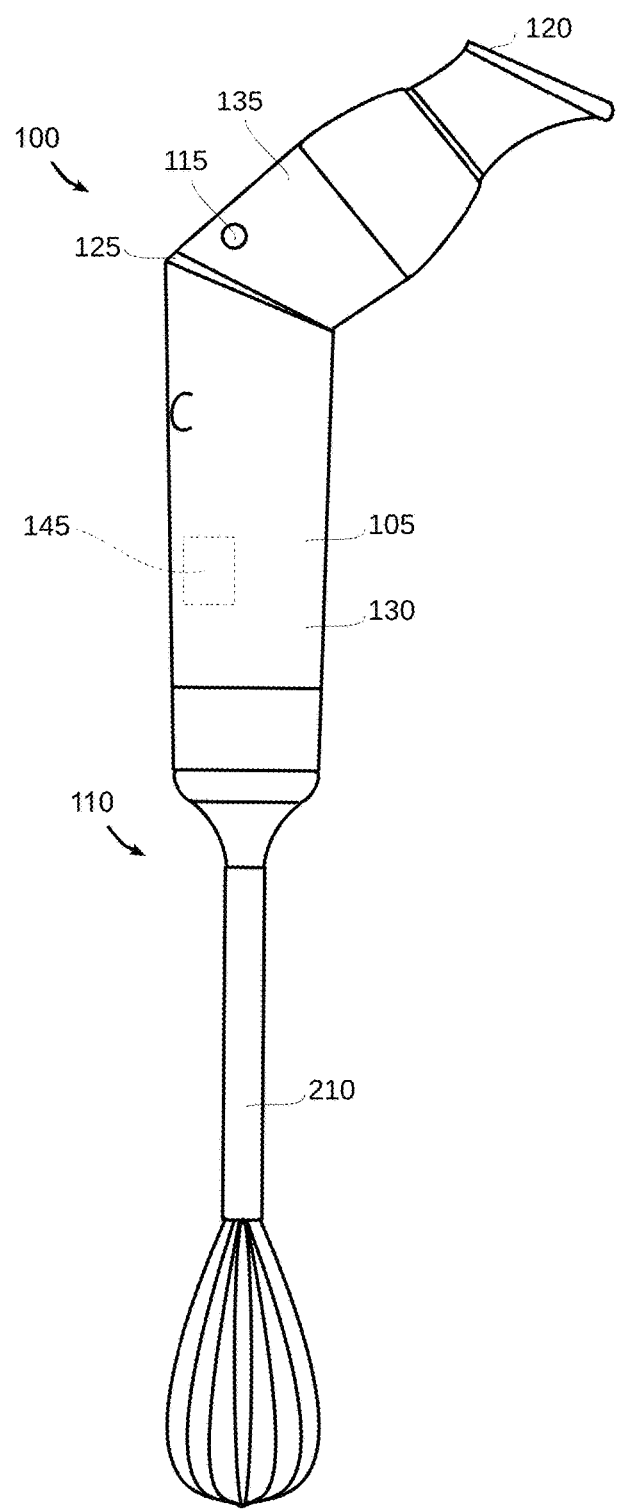
FIG. 2 is a front view of the multi-purpose handheld kitchen appliance of FIG. 1 with a second attachment consistent with some embodiments of the invention.
Figure 3A:
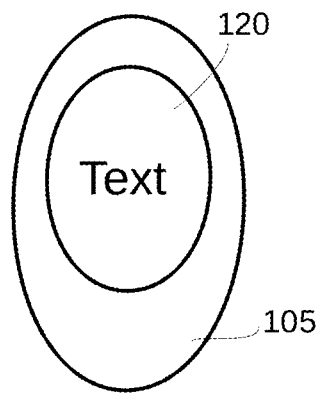
FIGS. 3A-B are top views of the multi-purpose handheld kitchen appliance of FIG. 1 consistent with some embodiments of the invention.
Figure 3B:
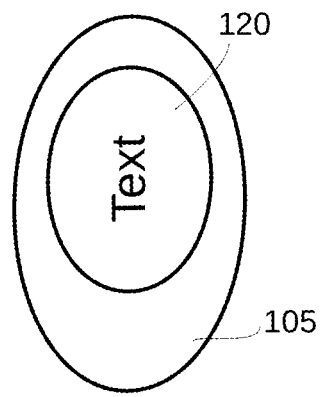

As noted above, an appliance consistent with the invention may also control a display orientation based at least in part on an attachment type, e.g., in combination with a gyroscope input. As illustrated in block 730, for example, a gyroscope may be used to determine the orientation of the multi-purpose handheld kitchen appliance. Specifically, the gyroscope determines the orientation of the unitary body of the multi-purpose handheld kitchen appliance (e.g., the housing in combination with the attachment). In block 735, the display may be rotated upon the detection of the orientation of the unitary body. As a non-limiting example, where the housing may be capable of being hinged, swiveled, rotated or the like (as illustrated in FIGS. 1-2) the display may rotate accordingly with the movement so it may be easier for a user to read. Also, where the particular type of attachment coupled to the housing naturally orients the unitary body in a particular orientation when used, the controller may rotate the display accordingly, e.g., such that the display is presented in an orientation most likely to be readable by the user during use. In some instances, the selection of a display orientation may be based on attachment type, and not based upon any orientation detected using a gyroscope. Further, in some instances a display may be deactivated altogether based on attachment type, e.g., if another display is present on the attachment itself.

As also noted above, an appliance consistent with the invention may also selectively disable one or more activation controls on a housing based at least in part on an attachment type. As illustrated in block 740, for example, a first activation control located on the housing may be deactivated based on the determination of the attachment type. In block 745, a second activation control located on an attachment may be activated based, at least in part, on the determination of the attachment type. This may be particularly beneficial, for example, in instances where the orientation of the housing may need to change for user to utilize the handheld kitchen appliance with the attachment, which may result in the first activation control 515 on the housing 505 being difficult or cumbersome for a user to access, or otherwise capable of being inadvertently activated. As a non-limiting example, where the attachment is the immersion blender (see FIGS. 5A-B), the one or more activation controls on the housing may be used by a user to control the motor; in other instances, where the attachment is, for example, a hand mixer (see FIGS. 6A-B), the one or more activation controls on the housing may be deactivated so that the one or more activation controls on the attachment may then be activated.

While the examples illustrated herein include both a housing and an attachment coupled together into a unitary body, the invention is not so limited and may include merely a housing that is capable of receiving an attachment.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A multi-purpose handheld kitchen appliance, comprising:
   a housing including a motor;
   an attachment removably coupled to the housing to form a unitary body therewith and configured to be driven by the motor when the attachment is coupled to the housing;
   a gyroscope positioned to sense an orientation of the unitary body;
   a display disposed on the housing; and
   a controller disposed in the housing and configured to:
      determine an attachment type of the attachment;
      detect, using the gyroscope, the orientation of the unitary body and rotate the display based upon the orientation of the unitary body; and
      control the motor based at least in part on the determined attachment type.

2. The multi-purpose handheld kitchen appliance of claim 1, further comprising an attachment identifier coupled to the housing and configured to detect the attachment type of the attachment when the attachment is coupled to the housing, wherein the controller is configured to determine the attachment type of the attachment using the attachment identifier.

3. The multi-purpose handheld kitchen appliance of claim 1, wherein in response to an activation input by a user, the controller is configured to controllably vary a speed of the motor among a plurality of speeds based at least in part on the determined attachment type.

4. The multi-purpose handheld kitchen appliance of claim 1, wherein the controller is configured to controllably vary a speed of the motor by executing a programmed cycle that transitions between the plurality of speeds during the programmed cycle based on the determined attachment type.

5. The multi-purpose handheld kitchen appliance of claim 1, wherein the housing further includes a sensor, and the controller is further configured to receive data from the sensor and controllably vary a speed of the motor based on the data from the sensor.

6. The multi-purpose handheld kitchen appliance of claim 1, wherein the attachment further includes a sensor, and the controller is further configured to receive data from the sensor and controllably vary a speed of the motor based on the data from the sensor.

7. The multi-purpose handheld kitchen appliance of claim 1, wherein the attachment is an immersion blender attachment, a hand mixer attachment, a whisk attachment, a nut chopping attachment, a salad shredder attachment, a spiralizer attachment, a pasta making attachment, or a juicer attachment.

8. The multi-purpose handheld kitchen appliance of claim 1, wherein the controller is further configured to disable the display based at least in part on the determined attachment type.

9. The multi-purpose handheld kitchen appliance of claim 1, wherein the housing further includes a first activation control that controls the motor, and wherein the controller is configured to disable the first activation control on the housing and activate a second activation control on the attachment that activates the motor based at least in part on the determined attachment type.

10. A multi-purpose handheld kitchen appliance, comprising:
    a housing including a motor and a first activation control configured to activate the motor;
    an attachment removably coupled to the housing to form a unitary body therewith and configured to be driven by the motor when the attachment is coupled to the housing, the attachment including a second activation control configured to activate the motor when the attachment is coupled to the housing;
    a controller disposed in the housing and configured to:
       determine an attachment type of the attachment;
       in response to the determination of the attachment type, disable the first activation control on the housing and activate the second activation control on the attachment such that the motor is activated in response to selection of the second activation control rather than in response to selection of the first activation control when the attachment is coupled to the housing; and
       control the motor based at least in part on the determined attachment type.

11. The multi-purpose handheld kitchen appliance of claim 10, further comprising an attachment identifier coupled to the housing and configured to detect the attachment type of the attachment when the attachment is coupled to the housing, wherein the controller is configured to determine the attachment type of the attachment using the attachment identifier.

12. The multi-purpose handheld kitchen appliance of claim 10, wherein in response to an activation input by a user, the controller is configured to controllably vary a speed of the motor among a plurality of speeds based at least in part on the determined attachment type.

13. The multi-purpose handheld kitchen appliance of claim 10, further comprising a display disposed on the housing.

14. The multi-purpose handheld kitchen appliance of claim 13, further comprising a gyroscope, wherein the controller is configured to detect, using the gyroscope, an orientation of the unitary body and rotate the display based upon the orientation of the unitary body.

15. A multi-purpose handheld kitchen appliance, comprising:
    a housing including a motor;
    an attachment removably coupled to the housing to form a unitary body therewith and configured to be driven by the motor when the attachment is coupled to the housing;
    a display disposed on the housing; and
    a controller disposed in the housing and configured to:
       determine an attachment type of the attachment;
       rotate or disable the display based at least in part on the determined attachment type; and
       control the motor based at least in part on the determined attachment type.

16. The multi-purpose handheld kitchen appliance of claim 15, further comprising an attachment identifier coupled to the housing and configured to detect the attachment type of the attachment when the attachment is coupled to the housing, wherein the controller is configured to determine the attachment type of the attachment using the attachment identifier.

17. The multi-purpose handheld kitchen appliance of claim 15, further comprising a gyroscope, wherein the controller is configured to detect, using the gyroscope, an orientation of the unitary body and rotate the display based upon the orientation of the unitary body.

18. The multi-purpose handheld kitchen appliance of claim 15, wherein the housing further includes a first activation control that controls the motor, and wherein the controller is configured to disable the first activation control on the housing and activate a second activation control on the attachment that activates the motor based at least in part on the determined attachment type.

19. The multi-purpose handheld kitchen appliance of claim 15, wherein the controller is configured to rotate or disable the display based at least in part on the determined attachment type by rotating the display based at least in part on the determined attachment type.

20. The multi-purpose handheld kitchen appliance of claim 15, wherein the controller is configured to rotate or disable the display based at least in part on the determined attachment type by disabling the display based at least in part on the determined attachment type.

* * * * *